(No Model.)
G. F. E. PEARSALL.
SCREEN FOR PHOTOGRAPHIC CAMERAS.
No. 265,980. Patented Oct. 17, 1882.
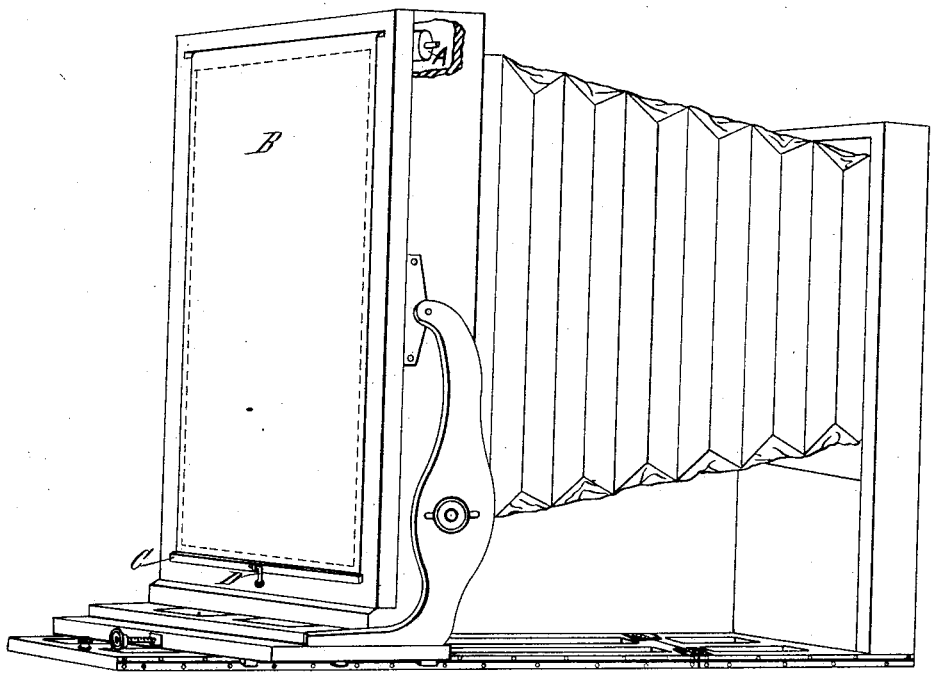
Witnesses
John Buckler
Harold M. Whiteway
G. Frank E. Pearsall
Inventor
By P. E. Valentine
Attorney.

UNITED STATES PATENT OFFICE.

G. FRANK E. PEARSALL, OF BROOKLYN, NEW YORK.

SCREEN FOR PHOTOGRAPHIC CAMERAS.

SPECIFICATION forming part of Letters Patent No. 265,980, dated October 17, 1882.

Application filed July 31, 1882. (No model.)

*To all whom it may concern:*

Be it known that I, G. FRANK E. PEARSALL, of the city of Brooklyn and State of New York, have invented a new and useful Improvement in Screens for Photographic Cameras; and I do hereby declare that the following specification, taken in connection with the drawing annexed to and forming part of the same, furnishes a full and clear description thereof, sufficient to enable those skilled in the art to which it pertains to make and operate the same.

In the drawing the figure is a view of a camera with one of its corners cut away to show a roller inside thereof operating the screen shown in my invention.

Prior to my invention it was customary to provide such cameras with a screen, upon which the reflected image was thrown to enable the operator to properly adjust the focus of the lens. When the focus was properly adjusted, so that the image on this screen was satisfactory, the screen was detached from the camera and the sensitive plate substituted in its place, the operator knowing that the image as it appeared upon the screen would be the same upon the sensitive plate. The substance almost universally used for such screen was a plate of ground glass set in a wooden frame, which was fitted to the back of the camera by springs or hooks. There are many objections to this sort of screen. It is easily broken or cracked, and requires careful handling. It consumes valuable time just at the critical moment (after the sitter has fixed his expression) to remove the screen and to substitute the plate. It is often too heavy to be quickly handled, and in out-of-doors work is apt to be overlooked and left behind, because it is detached from the camera.

By my improvement I furnish a screen which is always attached to the camera; which occupies but little space, and is of comparatively little weight; is not liable to fracture or loss, and which is operated instantaneously and automatically. To secure the results I attach to the frame-work at the back of the camera (preferably at the inside upper edge thereof) an automatic spring-roller of any suitable construction, as shown at A. This roller needs no special description, as it is like the well-known spring-roller used for window-shades in dwellings or at carriage-windows, consisting of a hollow cylinder operated by a coiled spring, the chief requisites being that it shall operate evenly and quickly. To this roller I attach a piece of any suitable thin, flexible, translucent material, B, a piece of prepared tracing-muslin furnishing a good material for that purpose. To the surface of the roller A I attach the inner end of the flexible screen B, and to the outer end of the screen I fasten a rigid strip, C, to keep it distended smoothly. A suitable hook or clamp, D, is provided at the opposite edge of the camera to hold this strip C when the screen is drawn out, the force of the spring keeping the latter distended smoothly to receive the image. The adjustment of the focus being made, upon slipping the hook or opening the clamp D an instantaneous removal of the screen B into the camera will be automatically effected by the spring-roller, and the sensitive plate can be inserted without delay or distraction of the attention of the operator to the screen.

It is obvious that other and equivalent means for automatically removing the flexible screen can be substituted for the spring-roller without affecting the principle of my invention. For instance, the screen B may be gathered up on traveling rods by the direct tension of an elastic, or pulled up like the drop of a stage, or automatically removed by the falling of a weight instead of a spring.

Having thus described my invention, I do not claim broadly the use of a screen in combination with a camera, nor do I claim the spring-roller and flexible curtain by themselves; but

What I do claim, and desire to secure by Letters Patent, is—

In combination with a photographic camera, a flexible translucent screen attached to said camera and automatically operated, substantially as and for the purposes specified.

G. FRANK E. PEARSALL.

Witnesses:
HAROLD M. WHITEWAY,
THOS. D. CARTER.